(12) United States Patent
Mazza et al.

(10) Patent No.: US 11,101,509 B2
(45) Date of Patent: Aug. 24, 2021

(54) BATTERY COOLING PLATE WITH DISTRIBUTED COOLANT FLOW

(71) Applicant: GM GLOBAL TECHNOLOGY OPERATIONS LLC, Detroit, MI (US)

(72) Inventors: Jason Mazza, Center Line, MI (US); Faruk Sohag, Canton, MI (US); Robert J. Schoenherr, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 151 days.

(21) Appl. No.: 16/590,814

(22) Filed: Oct. 2, 2019

(65) Prior Publication Data

US 2021/0104790 A1 Apr. 8, 2021

(51) Int. Cl.
| | |
|---|---|
| *H01M 2/12* | (2006.01) |
| *H01M 10/6556* | (2014.01) |
| *H01M 10/613* | (2014.01) |
| *H01M 10/6551* | (2014.01) |
| *H01M 10/625* | (2014.01) |
| *H01M 50/20* | (2021.01) |

(52) U.S. Cl.
CPC ..... *H01M 10/6556* (2015.04); *H01M 10/613* (2015.04); *H01M 10/625* (2015.04); *H01M 10/6551* (2015.04); *H01M 50/20* (2021.01); *H01M 2220/20* (2013.01)

(58) Field of Classification Search
CPC ......... H01M 10/6556; H01M 10/6557; H01M 10/655; H01M 10/613; H01M 10/625; H01M 10/6551; H01M 50/20; H01M 50/2004; H01M 2220/20
See application file for complete search history.

(56) References Cited

U.S. PATENT DOCUMENTS

| | | | | |
|---|---|---|---|---|
| 8,877,366 | B2 * | 11/2014 | Weber | H01M 10/613 |
| | | | | 429/120 |
| 10,006,722 | B2 * | 6/2018 | Kenney | F28F 3/08 |
| 2016/0149276 | A1 * | 5/2016 | Elliot | H01M 10/0525 |
| | | | | 429/72 |
| 2018/0337434 | A1 * | 11/2018 | Burgers | H01M 10/613 |

FOREIGN PATENT DOCUMENTS

| | | |
|---|---|---|
| DE | 202018004979 U1 | 1/2020 |
| DE | 202019101687 U1 | 6/2020 |
| DE | 102019105133 A1 | 9/2020 |

* cited by examiner

*Primary Examiner* — Raymond Alejandro
(74) *Attorney, Agent, or Firm* — Quinn IP Law

(57) ABSTRACT

A cooling plate distributes a coolant for an electrical battery, and is defined by parallel first and second edges and parallel third and fourth edges. A coolant inlet is arranged at a junction between the first and fourth edges, and a coolant outlet arranged at a junction between the second and fourth edges. A first coolant channel is arranged along the first edge, in direct communication with the inlet, and a second coolant channel is arranged along the second edge, in direct communication with the outlet. First and second sets of coolant mini-channels are in direct communication with the second channel. A first coolant manifold, arranged proximate the third edge, is in direct communication with the first channel. A second coolant manifold, arranged proximate the fourth edge, is in direct communication with the inlet. The two manifolds are in communication with the outlet via the respective sets of mini-channels.

20 Claims, 5 Drawing Sheets

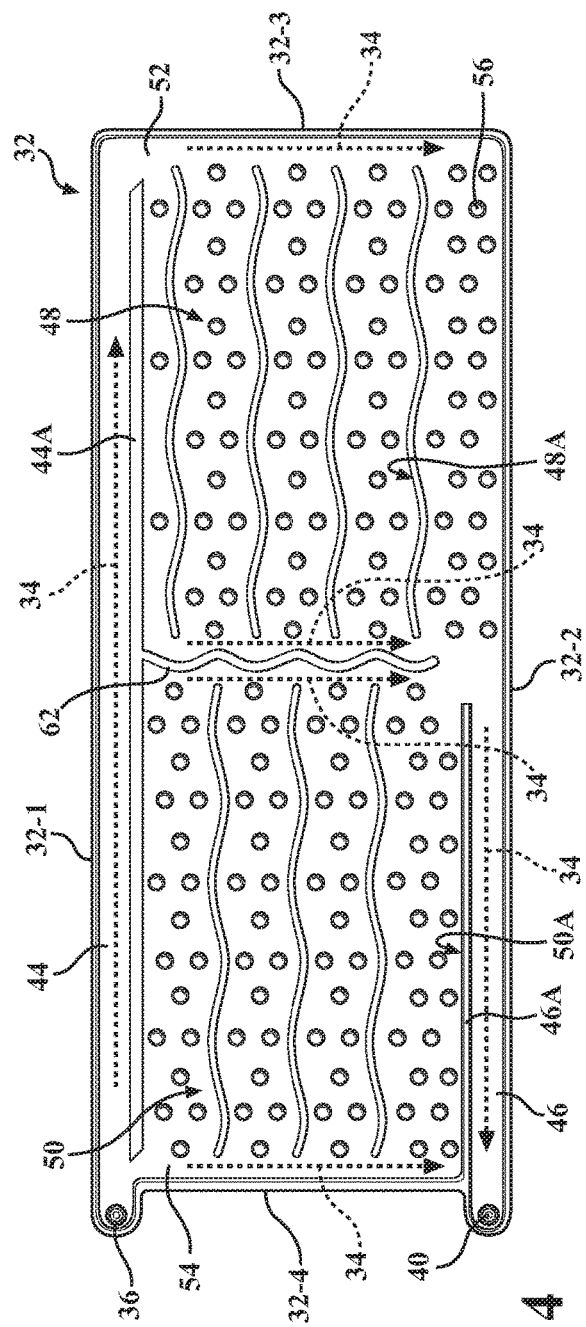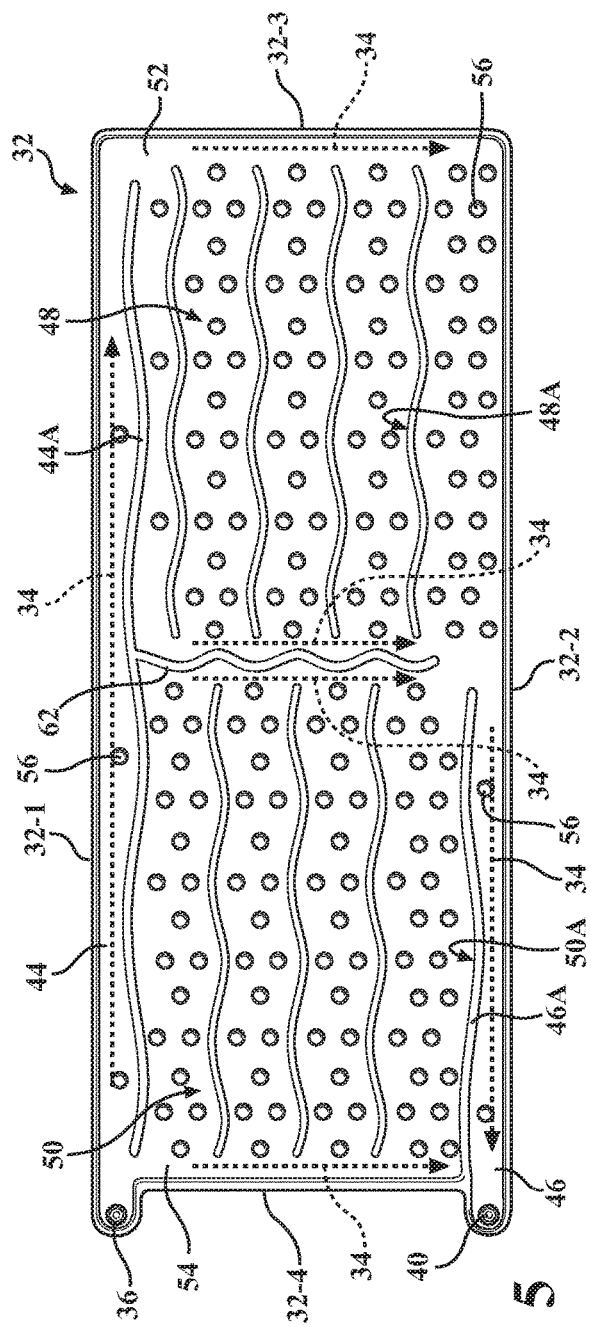

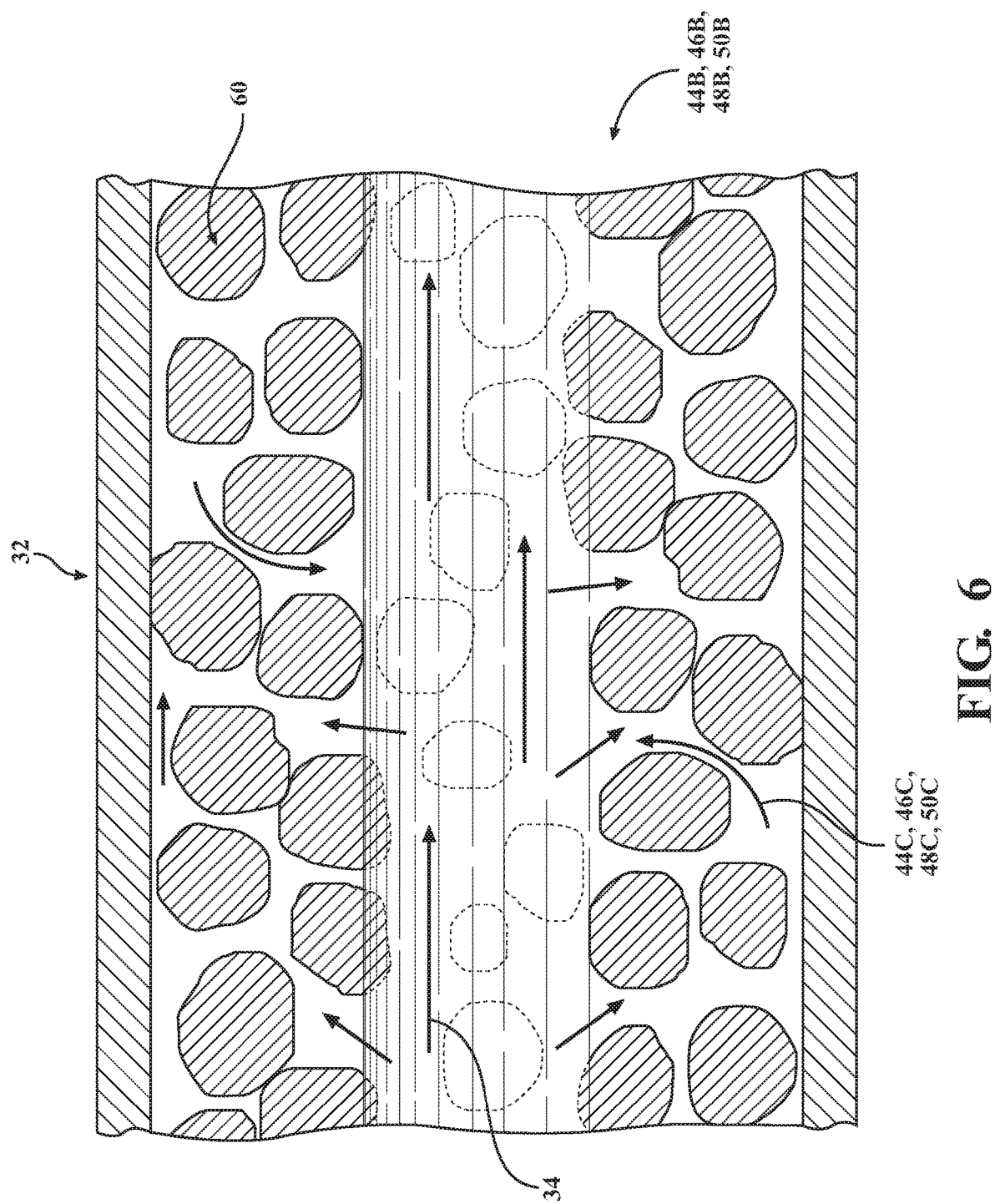

BATTERY COOLING PLATE WITH DISTRIBUTED COOLANT FLOW

INTRODUCTION

The present disclosure relates to construction of a cooling plate with distributed coolant flow for batteries and battery arrays.

A battery system or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Unless accompanied by effective cooling, such chemical reactions may cause more heat to be generated by the batteries than is effectively withdrawn, thereby causing battery damage. In battery arrays, liquid cooling is frequently employed to reduce the spread of thermal energy from a cell experiencing elevated temperature to adjacent cells.

SUMMARY

A cooling plate distributes a flow of coolant for a battery configured to generate and store electrical energy through heat-producing electro-chemical reactions. The cooling plate is defined by parallel first and second perimeter edges, parallel third and fourth perimeter edges, and a plate surface area. The cooling plate includes a coolant inlet arranged at a junction between the first and fourth perimeter edges, and a coolant outlet arranged at a junction between the second and fourth perimeter edges. The cooling plate also includes a first coolant channel arranged along the first perimeter edge and in direct fluid communication with the coolant inlet, and a second coolant channel arranged along the second perimeter edge and in direct fluid communication with the coolant outlet.

The cooling plate additionally includes a first set and a second set of coolant mini-channels, each arranged parallel to the first and second perimeter edges, each in direct fluid communication with the second coolant channel, and together configured to distribute the flow of coolant across the plate surface area. The cooling plate also includes a first coolant manifold arranged proximate the third perimeter edge and a second coolant manifold arranged proximate the fourth perimeter edge. The first coolant manifold is in direct fluid communication with the first coolant channel and the second coolant manifold is in direct fluid communication with the coolant inlet. The first and second coolant manifolds are also in fluid communication with the coolant outlet via the first set and the second set of coolant mini-channels, respectively.

Each of the first set and the second set of coolant mini-channels may be defined by mini-channel boundaries configured to separate the coolant mini-channels from one another. At least one of the mini-channel boundaries may be defined by a sinusoidal shape.

Each mini-channel may be additionally defined by a respective mini-channel surface. Each of the first and second coolant channels may be defined by a respective coolant channel surface. At least one of the mini-channels includes a feature arranged on the mini-channel surface and configured to induce turbulence in the flow of coolant.

The feature may be a plurality of protrusions or convexities extending into the flow of coolant.

Each of the plurality of protrusions may be defined by a deformation of the mini-channel surface.

The cooling plate may have a clamshell construction. Such construction may include two sub-plates fused together and configured to define the respective coolant channel surfaces of the first and second coolant channels and the respective mini-channel surface of each of the mini-channels.

At least one of the respective first and second coolant channel surfaces or at least one of the respective mini-channel surfaces may include a plurality of particles deposited thereon, for example as part of a spray-on coating.

The particles may be formed from Copper or Aluminum and configured to enhance transfer of heat from the cooling plate.

The cooling plate may additionally include a partition configured to fluidly separate the first set of coolant mini-channels from the second set of coolant mini-channels and guide the flow of coolant from the respective first and second sets of coolant mini-channels to the second coolant channel.

The partition may be defined by a sinusoidal shape.

A battery module employing such a cooling plate is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 4 is a schematic close-up top view of another embodiment of the cooling plate shown in FIG. 2, according to the disclosure.

FIG. 5 is a schematic close-up top view of another embodiment of the cooling plate shown in FIG. 2, according to the disclosure.

FIG. 6 is a schematic close-up top partial view of an embodiment of various coolant channels of the cooling plate shown in FIGS. 3-5, showing particles deposited on the surfaces of respective channels, according to the disclosure.

DETAILED DESCRIPTION

Figure 1:
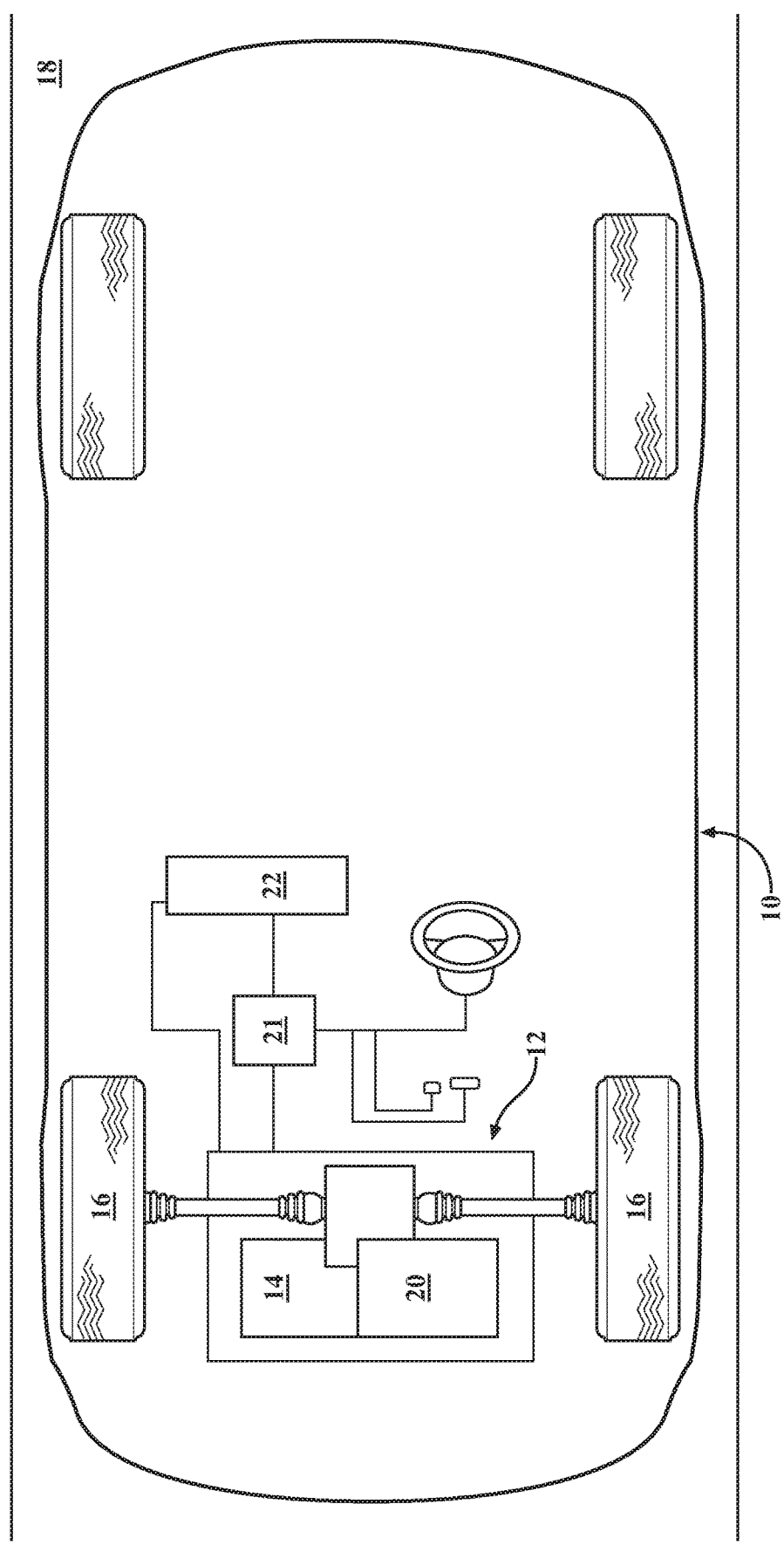
FIG. 1 is a schematic top view of an embodiment of a motor vehicle employing a hybrid powertrain with multiple power-sources, and a battery module using a battery array configured to generate and store electrical energy for supplying the electrical energy to the power-sources, according to the disclosure.
Figure 2:
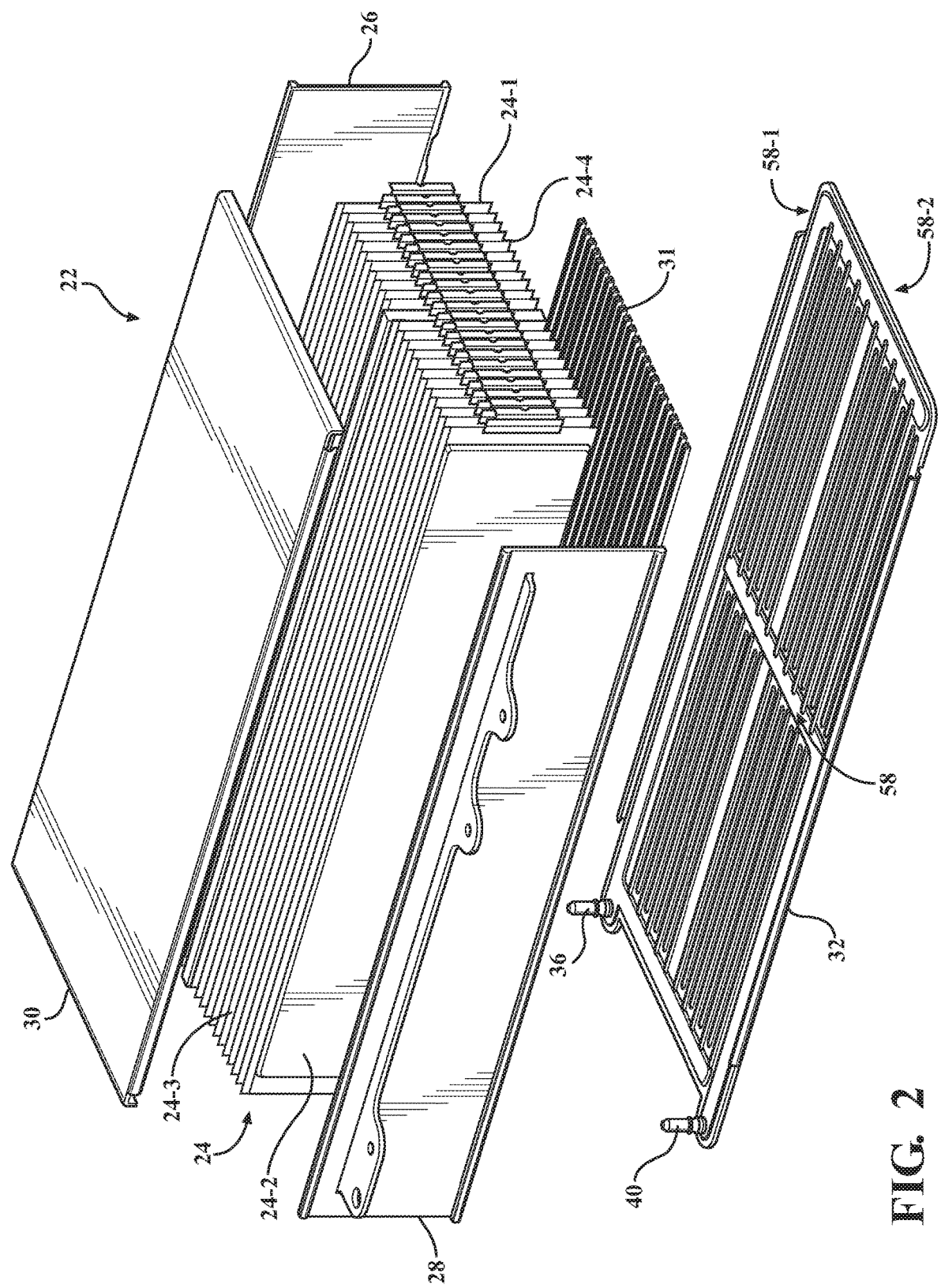
FIG. 2 is a schematic top perspective exploded view of the battery module shown in FIG. 1, having a cooling plate configured to distribute a flow of coolant for managing heat transfer from the battery array to the environment, according to the disclosure.
Figure 3:
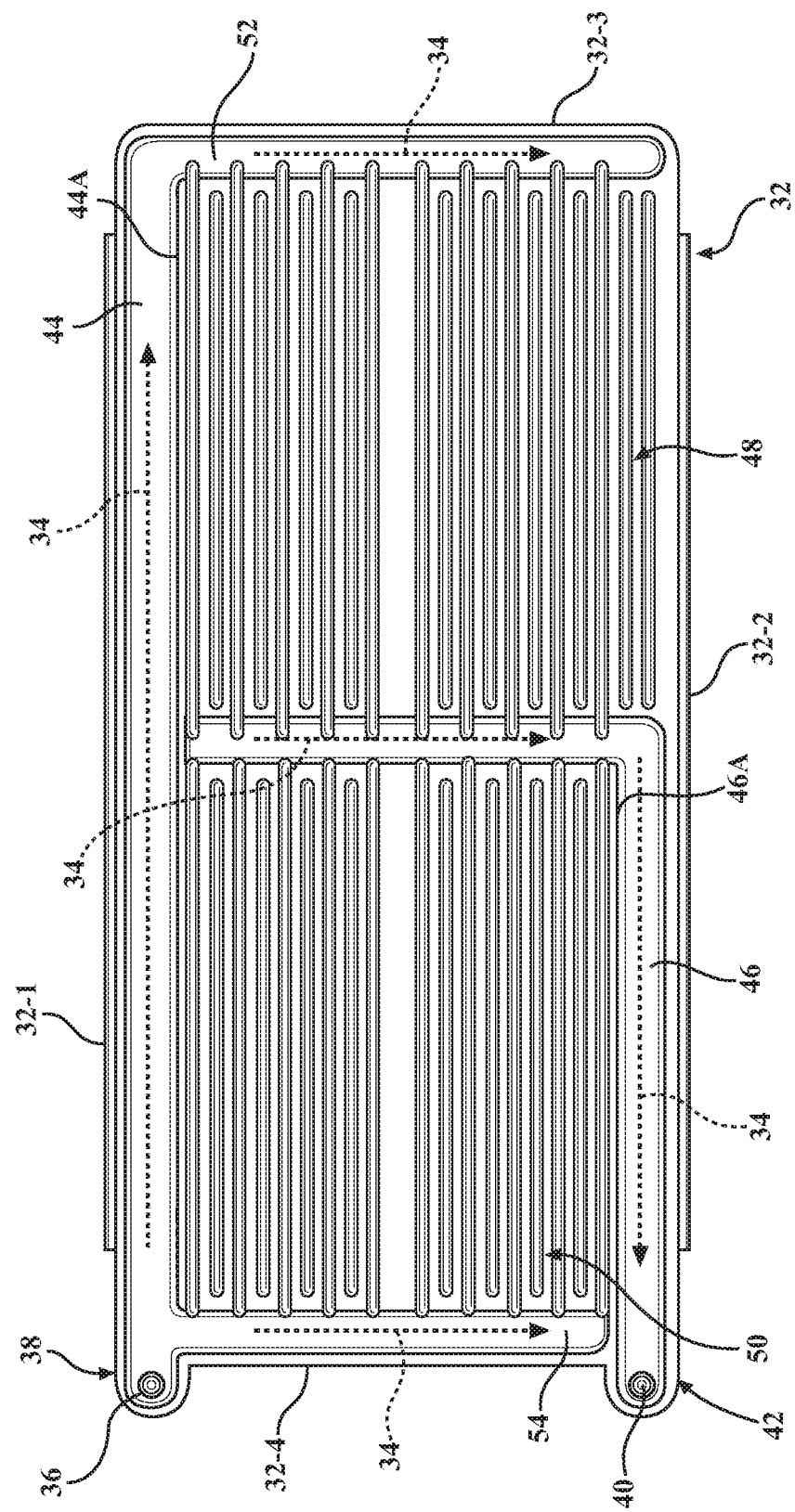
FIG. 3 is a schematic close-up top view of one embodiment of the cooling plate shown in FIG. 2, according to the disclosure.

Referring to FIGS. 1-3, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure.

The powertrain 12 includes a power-source 14 configured to generate a power-source torque T (shown in FIGS. 1-5) for propulsion of the vehicle 10 via driven wheels 16 relative to a road surface 18. The power-source 14 is depicted as an electric motor-generator. The powertrain 12 may also include an additional power-source 20, such as an internal combustion engine. The power-sources 14 and 20 may act in concert to power the vehicle 10. The vehicle 10 additionally includes a programmable electronic controller 21 and a battery module 22. The battery module 22 may include one or more battery sections 24, such as cells or arrays, configured to generate and store electrical energy for powering the power-sources 14 and 20. Each battery section 24 in the battery module 22 generates and stores electrical energy through heat-producing electro-chemical reactions. Operation of the powertrain 12 and the battery module 22 may generally be regulated by the electronic controller 21.

As shown in FIG. 2, the battery section 24 has a first side-wall 24-1, a second side-wall 24-2, a top surface 24-3, and a bottom surface 24-4. The battery module 22 includes a first side plate 26, a second side plate 28, and a cover 30 attached to the first and second side plates. The first side plate 26, the second side plate 28, and the cover 30 are configured to bound the battery section 24 on the respective first side-wall 24-1, second side-wall 24-2, and top surface 24-3. As additionally shown in FIG. 2, an epoxy layer 31 may be applied to the bottom surface 24-4 of the battery section 24. The battery module 22 also includes a cooling plate 32 configured to manage heat transfer from the battery section 24 to the environment. The cooling plate 32 is attached to the first and second side plates 26, 28 to thereby bound the battery section 24 on the bottom surface 24-4. The cooling plate 32 may be additionally affixed to the bottom surface 24-4 of the battery section 24 via the epoxy layer 31. As shown in FIGS. 3-5, the cooling plate 32 is defined by a first perimeter edge 32-1 and second perimeter edge 32-2, wherein the first perimeter edge is parallel to the second perimeter edge. The cooling plate 32 is additionally defined by a third perimeter edge 32-3 and fourth perimeter edge 32-4, wherein the third perimeter edge is parallel to the fourth perimeter edge. The first and second perimeter edges 32-1, 32-2 are also orthogonal to the third and fourth perimeter edges 32-3, 32-4. The cooling plate 32 is further defined by a plate surface area A.

The cooling plate 32 is configured to accept a flow of circulating coolant 34 therethrough to remove heat produced by the battery section 24. To that end, as shown in FIGS. 3-5, the cooling plate 32 includes a coolant inlet 36 arranged at a junction 38 between the first perimeter edge 32-1 and the fourth perimeter edge 32-4. The cooling plate 32 also includes a coolant outlet 40 arranged at a junction 42 between the second perimeter edge 32-2 and the fourth perimeter edge 32-4. A first coolant channel 44 is arranged along the first perimeter edge 32-1 and in direct fluid communication with the coolant inlet 36. A second coolant channel 46 is arranged along the second perimeter edge 32-2 and in direct fluid communication with the coolant outlet 40. Additionally, the cooling plate 32 includes a first set of coolant mini-channels 48 and a second set of coolant mini-channels 50. Each of the first and second set of coolant mini-channels 48, 50 is arranged parallel to and along the first and second perimeter edges 32-1, 32-2, and, therefore, transverse the third and fourth perimeter edges 32-3, 32-4. Each of the first and second set of coolant mini-channels 48, 50 is in direct fluid communication with the second coolant channel 46. The first and second set of coolant mini-channels 48, 50 are together configured to distribute the flow of circulating coolant 34 across the plate surface area A.

The cooling plate 32 also includes a first coolant manifold 52 arranged proximate the third perimeter edge 32-3 and a second coolant manifold 54 arranged proximate the fourth perimeter edge 32-4. The first coolant manifold 52 is in direct fluid communication with the first coolant channel 44. The second coolant manifold 54 is in direct fluid communication with the coolant inlet 36. Additionally, the first and second coolant manifolds 52, 54 are in fluid communication with the coolant outlet 40 via the first set and the second set of coolant mini-channels 48, 50, respectively. In other words, the first and second coolant manifolds 52, 54 are configured to receive at least a portion of the circulating coolant 34 flow and distribute the subject portion of the coolant flow across the respective coolant mini-channels 48, 50. In turn, as the flow of circulating coolant 34 passes through the coolant mini-channels 48, 50, the mini-channels are configured to direct the respective distributed portions of the coolant 34 flow to the coolant outlet 40.

With continued reference to FIGS. 3-5, each the first and second coolant channels 44, 46 may be defined by respective channel boundaries 44A, 46A and respective coolant channel surfaces 44B, 46B. As shown, in FIG. 5, the coolant channel boundaries 44A, 46A may be defined by a sinusoidal shape. The sinusoidal shape of the particular coolant channel boundary 44A or 46A is intended to generate turbulence in the flow of coolant 34 through the subject coolant channel 44 or 46 and thereby promote transfer of heat from the coolant 34 in the subject coolant channel to the environment. As shown in FIGS. 4 and 5, at least one of the first and second coolant channels 44, 46 may include feature(s) 56 arranged on the channel surface 44B or 46B. The feature(s) 56 are intended to create micro-channels 44C, 46C within the respective coolant channel 44 or 46, and configured to induce turbulence and vortices in the flow of coolant 34 passing therethrough, to thereby aid transfer of heat to the environment. The feature(s) 56 may be a plurality of protrusions or convexities extending into the flow of circulating coolant 34. Such protrusions may be defined by deformations of the coolant channel surface 44B or 46B.

As shown in FIGS. 3-5, each of the first set and the second set of coolant mini-channels 48, 50 may be defined by respective mini-channel boundaries 48A, 50A configured to separate the coolant mini-channels from one another. As shown, in FIGS. 4-5, and similar to the coolant channel boundaries 44A, 46A in the first or second coolant channels 44, 46, one or more of the mini-channel boundaries 48A, 50A may be defined by a sinusoidal shape. The sinusoidal shape of the particular mini-channel boundaries 48A, 50A is intended to generate turbulence in the flow of coolant 34 through the subject mini-channel 48 or 50 and thereby promote transfer of heat from the coolant 34 in the subject mini-channel to the environment. Each of the mini-channels 48, 50 may be defined by a respective mini-channel surface 48B, 50B. Additionally, one or more of the mini-channels may include feature(s) 56 arranged on the mini-channel surface 48B or 50B. Analogously to the feature(s) 56 in the first or second coolant channels 44, 46, the feature(s) 56 in the mini-channels 48, 50 are intended to create micro-channels 48C, 50C within the respective mini-channels, and configured to induce turbulence and vortices in the flow of coolant 34 passing therethrough. As with the first and second coolant channels 44, 46, the feature(s) 56 may be a plurality of protrusions extending into the flow of circulating coolant 34. Such protrusions may be defined by deformations of the mini-channel surface 48B or 50B.

As shown in FIG. 2, the cooling plate 32 may have a clamshell construction 58. The clamshell construction 58 may include two sub-plates 58-1, 58-2 fused together and configured to define the respective coolant channel surfaces 44B, 46B and the respective mini-channel surfaces 48B, 50B. As shown in FIG. 6, each of the respective first and second coolant channel surfaces 44B, 46B and the respective mini-channel surfaces 48B, 50B may include a plurality of particles 60 deposited thereon, for example as part of a spray-on coating. The particles 60 may, for example, be formed from Copper or Aluminum. The particles 60 are intended to create micro-channels 44C, 46C, turbulence, and fluid vortices within the respective coolant channel 44, 46, and micro-channels 48C, 50C within the mini-channels 48, 50. Accordingly, the deposited particles 60 are intended to enhance dissipation of heat from the cooling plate 32 to the coolant, such as via increased heat transfer area, numerous micro-channels 44C, 46C within the micro-channel structure, inducing capillary action in coolant 34 flow, and turbulent mixing.

As shown in FIGS. 4-5, the cooling plate 32 may additionally include a partition 62. The partition 62 is configured to fluidly separate the first set of coolant mini-channels 48 from the second set of coolant mini-channels 50. Furthermore, the partition 62 is configured to guide the flow of circulating coolant 34 from the respective first and second sets of coolant mini-channels 48, 50 to the second coolant channel 46. As may be seen in FIGS. 4 and 5, the partition 62 may be defined by a sinusoidal shape, similar to the shape of the coolant channel boundaries 44A, 46A and the mini-channel boundaries 48A, 50A. The optional sinusoidal shape of the partition 62 is intended to generate turbulence in the flow of coolant 34 through the center of the cooling plate 32 and thereby promote transfer of heat in this area from the coolant 34 to the environment.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A cooling plate for distributing a flow of coolant for a battery configured to generate and store electrical energy through heat-producing electro-chemical reactions, the cooling plate defined by parallel first and second perimeter edges, parallel third and fourth perimeter edges, and a plate surface area, the cooling plate comprising:
    a coolant inlet arranged at a junction between the first and fourth perimeter edges, and a coolant outlet arranged at a junction between the second and fourth perimeter edges;
    a first coolant channel arranged along the first perimeter edge and in direct fluid communication with the coolant inlet, and a second coolant channel arranged along the second perimeter edge and in direct fluid communication with the coolant outlet;
    a first set and a second set of coolant mini-channels, each arranged parallel to the first and second perimeter edges, each in direct fluid communication with the second coolant channel, and together configured to distribute the flow of coolant across the plate surface area; and
    a first coolant manifold arranged proximate the third perimeter edge and a second coolant manifold arranged proximate the fourth perimeter edge, wherein the first coolant manifold is in direct fluid communication with the first coolant channel and the second coolant manifold is in direct fluid communication with the coolant inlet, and the first and second coolant manifolds are in fluid communication with the coolant outlet via the first set and the second set of coolant mini-channels, respectively.

2. The cooling plate of claim 1, wherein each of the first set and the second set of coolant mini-channels is defined by mini-channel boundaries configured to separate the coolant mini-channels from one another, and wherein at least one of the mini-channel boundaries is defined by a sinusoidal shape.

3. The cooling plate of claim 1, wherein each of the mini-channels is additionally defined by a respective mini-channel surface and each the first and second coolant channels is defined by a respective coolant channel surface, and wherein at least one of the mini-channels includes a feature arranged on the mini-channel surface and configured to induce turbulence in the flow of coolant.

4. The cooling plate of claim 3, wherein the feature is a plurality of protrusions extending into the flow of coolant.

5. The cooling plate of claim 4, wherein each of the plurality of protrusions is defined by a deformation of the mini-channel surface.

6. The cooling plate of claim 3, wherein the cooling plate has a clamshell construction including two sub-plates fused together and configured to define the respective coolant channel surfaces of the first and second coolant channels and the respective mini-channel surface of each of the mini-channels.

7. The cooling plate of claim 6, wherein at least one of the respective mini-channel surfaces or at least one of the respective first and second coolant channel surfaces includes a plurality of particles deposited thereto.

8. The cooling plate of claim 7, wherein the particles are formed from Copper or Aluminum and configured to enhance transfer of heat from the cooling plate.

9. The cooling plate of claim 1, further comprising a partition configured to fluidly separate the first set of coolant mini-channels from the second set of coolant mini-channels and guide the flow of coolant from the respective first and second sets of coolant mini-channels to the second coolant channel.

10. The cooling plate of claim 9, wherein the partition is defined by a sinusoidal shape.

11. A battery module comprising:
a battery section configured to generate and store electrical energy through heat-producing electro-chemical reactions and having a first side-wall, a second side-wall, a top surface, and a bottom surface;
a first side plate, a second side plate, and a cover attached to the first and second side plates, wherein the first side plate, the second side plate, and the cover are configured to bound the battery section on the respective first side-wall, second side-wall, and top surface; and
a cooling plate attached to the first and second side plates to thereby bound the battery section on the bottom surface, wherein the cooling plate is defined by parallel first and second perimeter edges, parallel third and fourth perimeter edges, and a plate surface area, and wherein the cooling plate is configured to accept a flow of coolant therethrough to remove heat produced by the battery section, the cooling plate including:
a coolant inlet arranged at a junction between the first and fourth perimeter edges, and a coolant outlet arranged at a junction between the second and fourth perimeter edges;
a first coolant channel arranged along the first perimeter edge and in direct fluid communication with the coolant inlet, and a second coolant channel arranged along the second perimeter edge and in direct fluid communication with the coolant outlet;
a first set and a second set of coolant mini-channels, each arranged parallel to the first and second perimeter edges, each in direct fluid communication with the second coolant channel, and together configured to distribute the flow of coolant across the plate surface area; and
a first coolant manifold arranged proximate the third perimeter edge and a second coolant manifold arranged proximate the fourth perimeter edge, wherein the first coolant manifold is in direct fluid communication with the first coolant channel and the second coolant manifold is in direct fluid communication with the coolant inlet, and the first and second coolant manifolds are in fluid communication with the coolant outlet via the first set and the second set of coolant mini-channels, respectively.

12. The battery module of claim 11, wherein each of the first set and the second set of coolant mini-channels is defined by mini-channel boundaries configured to separate the coolant mini-channels from one another, and wherein at least one of the mini-channel boundaries is defined by a sinusoidal shape.

13. The battery module of claim 11, wherein each of the mini-channels is additionally defined by a respective mini-channel surface and each the first and second coolant channels is defined by a respective coolant channel surface, and wherein at least one of the mini-channels includes a feature arranged on the mini-channel surface and configured to induce turbulence in the flow of coolant.

14. The battery module of claim 13, wherein the feature is a plurality of protrusions extending into the flow of coolant.

15. The battery module of claim 14, wherein each of the plurality of protrusions is defined by a deformation of the mini-channel surface.

16. The battery module of claim 13, wherein the cooling plate has a clamshell construction including two sub-plates fused together and configured to define the respective coolant channel surfaces of the first and second coolant channels and the respective mini-channel surface of each of the mini-channels.

17. The battery module of claim 16, wherein at least one of the respective first and second coolant channel surfaces or at least one of the respective mini-channel surfaces includes a plurality of particles deposited thereon.

18. The battery module of claim 17, wherein the particles are formed from Copper or Aluminum and configured to enhance transfer of heat from the cooling plate.

19. The battery module of claim 11, wherein the cooling plate additionally includes a partition configured to fluidly separate the first set of coolant mini-channels from the second set of coolant mini-channels and guide the flow of coolant from the respective first and second sets of coolant mini-channels to the second coolant channel.

20. The battery module of claim 19, wherein the partition is defined by a sinusoidal shape.

* * * * *